United States Patent

Jansson et al.

[11] Patent Number: 5,934,318
[45] Date of Patent: Aug. 10, 1999

[54] VALVE SYSTEM

[75] Inventors: Ulf Jansson; Rolf Ekholm, both of Karlstad, Sweden

[73] Assignee: Kvaerner Pulping aktiebolag, Sweden

[21] Appl. No.: 08/765,143

[22] PCT Filed: Jun. 22, 1995

[86] PCT No.: PCT/SE95/00768

§ 371 Date: Dec. 23, 1996

§ 102(e) Date: Dec. 23, 1996

[87] PCT Pub. No.: WO96/01963

PCT Pub. Date: Jan. 25, 1996

[30] Foreign Application Priority Data

Jul. 7, 1994 [SE] Sweden .................................. 9402404

[51] Int. Cl.[6] .................................................. F16K 15/00
[52] U.S. Cl. .......................... 137/526; 137/529; 137/906; 138/31
[58] Field of Search ..................... 137/526, 529, 137/906; 138/30, 31

[56] References Cited

U.S. PATENT DOCUMENTS

| 28,248 | 5/1860 | Bickford | 138/31 |
|---|---|---|---|
| 1,164,098 | 12/1915 | Kinsey | 137/526 |
| 1,819,827 | 8/1931 | Thwaits | 137/526 |
| 2,405,241 | 8/1946 | Smith | 137/526 |
| 2,538,897 | 1/1951 | Butler et al. | 138/31 |
| 2,741,262 | 4/1956 | Crookston | 137/529 X |
| 4,245,668 | 1/1981 | Lindstrom | 137/526 X |
| 4,273,153 | 6/1981 | Brown | 137/529 |
| 4,278,107 | 7/1981 | Dugge et al. . | |
| 4,620,562 | 11/1986 | Pacht | 137/529 |
| 4,646,782 | 3/1987 | Ezekoye | 138/31 |

FOREIGN PATENT DOCUMENTS

| 1 231 077 | 12/1966 | Germany . |
|---|---|---|
| 2 077 393 | 12/1981 | United Kingdom . |
| 87/03062 | 5/1987 | WIPO . |

Primary Examiner—Denise L. Ferensic
Assistant Examiner—Ramyar Farid
Attorney, Agent, or Firm—Rader, Fishman, & Grauer; Ronald P. Kananen

[57] ABSTRACT

The invention relates to a valve system for a space (1) which is under vacuum in relation to its surroundings (3), which valve system comprises a valve unit (7) which is intended to be arranged in association with a wall (2) which delimits the said space and has a wall opening (4) through the said wall, which valve unit comprises a valve (8) which is normally shut and closes the said wall opening but is arranged to be opened and allow air from the surroundings into the said space if the vacuum, i.e. the difference between the surrounding pressure and the pressure in the space, should exceed a previously defined value, which valve comprises a valve housing (12) which can be connected to the said wall (2) in association with the wall opening and which has at least one inlet opening (17) for air, a passage (6) for the air between the said, at least one, inlet opening and the said space (1), a valve seat (15) and a valve body (13) with a sealing surface (21) which is normally pressed against the valve seat by an external force with counteraction by the vacuum in order to keep the passage closed when the vacuum does not exceed the defined value but to permit the passage to be opened by the force developed by the vacuum on the valve body overcoming the external force when the vacuum exceeds the said value. According to the invention, the external force is obtained from a pneumatic power source (34).

6 Claims, 1 Drawing Sheet

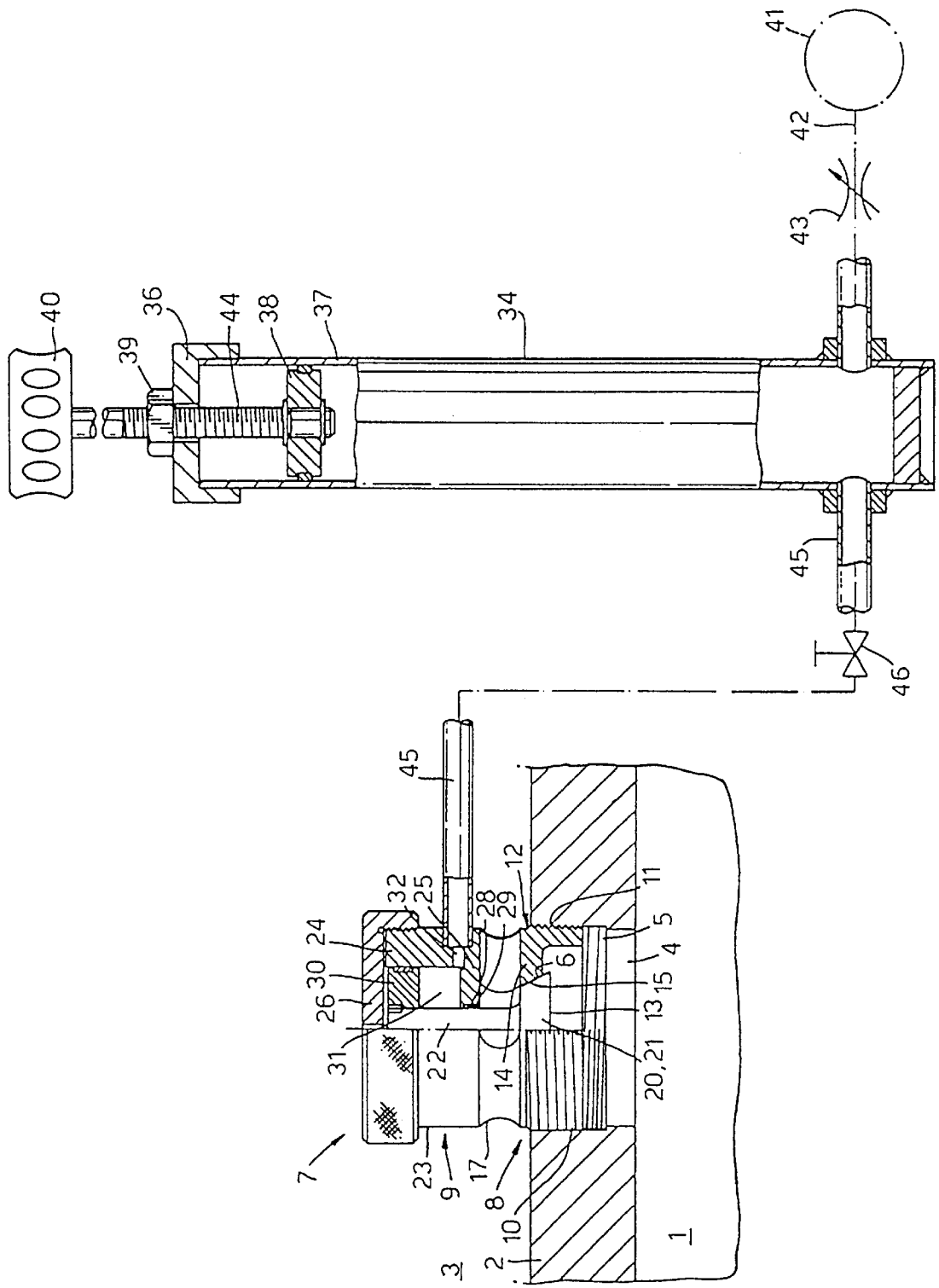

स्‍5,934,318

VALVE SYSTEM

TECHNICAL FIELD

The invention relates to a valve system for a space which is under vacuum in relation to its surroundings. The valve system comprises a valve unit which is arranged in association with a wall which delimits the space and has a wall opening through the wall. The valve unit comprises a valve which is normally shut and closes the wall opening but is arranged to be opened and allow air from the surroundings into the space if the vacuum, should exceed a previously defined value. The valve comprises a valve housing which can be connected to the wall in association with the wall opening. The valve housing has at least one inlet opening for air, a passage for the air between the inlet opening and the space, a valve seat and a valve body which is normally pressed against the valve seat by an external force with counteraction by the vacuum in order to keep the passage closed when the vacuum does not exceed the defined value but permits the passage to be opened by the force executed on the valve body when the vacuum exceeds the defined value.

BACKGROUND TO THE INVENTION

There is a need in many areas of application in industry, in particular within different process industries, to be able to limit the vacuum in apparatus, containers, treatment vessels, conduits and the like in which a space in the apparatus or equivalent in question is normally under a certain vacuum. Within the pulp and paper industry, for example, there are many points at which apparatus is operating under a certain vacuum. For example, vacuum pumps are used to deaerate pulp suspensions. In this context it is important that the vacuum does not exceed a given value as fibre pulp would otherwise be able to get into the vacuum pump. For this reason, it is customary to arrange vacuum valves in the wall which delimits the space which is under vacuum, with the valve being set so that it opens and allows air into the space if the vacuum exceeds a certain value. In this connection, it is known to use valves of the type described in a general fashion above, with the external force for pressing the valve body against the valve seat, with the counteraction of the force developed by the vacuum, being produced with the aid of a mechanical, coil-shaped spring, whose spring constant can be regulated using a screw, for example. A disadvantage of these known valves is that the spring must be relatively long, resulting, in turn, in the whole valve forming a long protuberance on the apparatus, conduit or equivalent in question. This results in the valve being readily subject to damage due to external action, particularly since the apparatus, conduit or equivalent, and consequently the valve as well, is often located in those environments where there is a high risk of damage.

BRIEF ACCOUNT OF THE INVENTION

The object of the invention is to make available a valve system of the type specified in the introduction, where the valve unit itself can be made to be very small, as a result of which the risk of mechanical damage due to external action can be decreased substantially. These and other aims can be achieved by means of the external force being obtained from a source of pneumatic power. More specifically, the source of pneumatic power can consist of a separate unit which is arranged at a distance from the valve unit and is connected to the valve unit via a conduit. Preferably, the power source consists of an air accumulator which contains air at a certain excess pressure in relation to the surrounding pressure.

The valve unit can comprise a pneumatic cylinder with a piston and a piston rod, or equivalent, which is in mechanical communication with the valve body, with the power source, preferably an air accumulator, being arranged to develop a pressure in the cylinder, and thereby a force on the piston, which force is transferred to the valve body via the piston rod or equivalent.

It is preferable for it to be possible to regulate the volume of the air accumulator, as a result of which the system can be adjusted so that the valve is open when a certain maximum vacuum is exceeded.

Additional features and aspects of the invention will be evident from the subsequent patent claims and the following description of a preferred embodiment.

BRIEF DESCRIPTION OF THE FIGURE

In the following description of a preferred embodiment, reference will be made to the attached FIGURE drawing, which illustrates the valve system according to the preferred embodiment.

DESCRIPTION OF PREFERRED EMBODIMENT

In the FIGURE drawing, a space is designated 1. Under the normal operational conditions for the apparatus which contains the space 1, the latter is under a certain vacuum in relation to its surroundings, which are designated 3. The space 1 is delimited by a wall 2, which can, for example, form a wall of a pump or a treatment vessel in a pulp mill. A through wall opening 4, which has the shape of a drill hole, is provided with threads 5.

A valve unit is, in a general fashion, designated 7. This unit, in turn, consists of a valve part or valve 8 and a force-developing part 9, termed adjusting part here.

The valve 8 consists of a valve housing 12 with a passage 6 and a valve body 13 in the passage 6. The valve housing 12 comprises, in turn, a cylindrical connecting piece 10 with external threads 11 which cooperate with the threads 5 in the wall opening 4, as a result of which the valve unit 7 is fixed in the wall opening 4. In addition, the valve housing 12 comprises a valve seat part 14 with a valve seat 15 and, above the valve seat part 14, a cylindrical air inlet section 16 with a number—four in accordance with the embodiment— of air inlet openings 17.

The valve body 13 consists of a valve cone 20 with a sealing surface 21 which can be pressed against the valve seat 15 under the influence of an external force from the adjusting part 9, which endeavours to convey the valve body 13 in a direction outwards from the space 1 which is under vacuum.

A pull rod, which forms the piston rod 22 in the adjusting part 9, constitutes an integrated part of the valve cone 20 and extends from the side of the latter facing away from the space 1 up into the adjusting part.

The adjusting part 9 has the form of a pneumatic cylinder 23 with a cylinder wall 24, which forms a continuation of the cylindrical air inlet section 16, a partition wall 25 between the valve part 8 and the adjusting part 9, and an end wall which has the form of an internally threaded cover, which is firmly screwed onto the cylindrical wall 24, which, at its end, is threaded externally.

The partition wall 25 has a hole 28 which passes through it centrally. The piston rod 22 extends through this hole. A gasket 29 is arranged to seal the hole 28 against the piston rod 22. At its external end, the piston rod is joined to a piston 30 which is arranged to be able to slide, with sealing, against the cylinder wall 24. A cylinder chamber is designated 31 and a channel through the cylinder wall 24 is designated 32.

The valve system also includes an air accumulator 34 which forms the said external power source. The air accumulator 34 consists of an elongated cylinder with a first, fixed end wall 35 and a second end wall 36, which has the form of an internally threaded cover which is firmly screwed, in a sealing manner, on the said cylinder, which is threaded on the appurtenant end. A piston 44, which seals against the inner side of the cylinder wall and which can be set to different positions in the cylinder 37 with the aid of a screw 44, which extends through a nut 39 on or in the end wall 36, is present in the cylinder 37 of the air accumulator 34. A handle for turning the screw 38 is designated 40.

The air accumulator 34 is connected to a compressed air network, which is diagrammatically shown by 41, via a conduit 42 in which a reducing valve 43 is arranged for maintaining the pressure in the air accumulator 34 constant.

The valve unit 7 is relatively small and projects only a short distance, for example from 30 to 50 mm, from the wall 2. It can, therefore, be made to be very robust, thereby substantially reducing the risk of damage. By contrast, the air accumulator 34 is considerably larger and is of a length which can, for example, amount to from 300 to 400 mm. However, this is of no importance since it can advantageously be arranged at a substantial distance from the valve unit 7 and be connected to the cylinder chamber 31 of the valve unit via a narrow pipe 45.

A shut-off valve 46 is present in the pipe conduit 45.

The valve system described above functions in the following manner. It is assumed that the space 1 is under a certain normal vacuum, that the air accumulator 34 is pressurized and that the regulating piston 38 is set to a position which corresponds to the desired maximum vacuum in the space 1. With the vacuum which exists in the space 1, the force which the pneumatic piston 30 in the adjusting part 9 exerts on the valve cone 20, by pulling on the piston rod 22 under the influence of the pressure in the cylinder chamber 31, which corresponds to the pressure in the air accumulator 34, is sufficient to overcome the inwardly directed force which the vacuum in the space 1 exerts on the valve cone 22. The passage 6 is thus normally kept closed by the valve body 3. If, however, the vacuum in the space 1 exceeds the previously defined value, the suction effect of the vacuum on the valve cone will overcome the outwardly acting force which the pressure in the cylinder chamber 31 exerts on the piston 30. When this occurs, the sealing surface 21 leaves its contact against the valve seat 15 such that an opening is established in the passage 6, as a result of which air can flow in through the air inlet openings 17 and through the gap between the sealing surface 21 and the valve seat 15 in the passage 6 into the space 1 so that the vacuum is reduced or abolished; "killed" as it is called by persons skilled in the art. After that, the valve body with the valve seat returns once again to its sealing position under the influence of the pressure in the cylinder chamber 31.

If it is desired that the valve should open at a lower vacuum, the piston 38 is screwed, with the aid of the handle 40 and the screw 44, in such a direction that the air accumulator volume in the air accumulator 34, which volume is in communication with the cylinder chamber 31, increases and vice versa, i.e. is caused to decrease the volume if it is desired, instead, that the valve should only open when the vacuum is greater.

We claim:

1. Valve system for a pulp accommodating and conveying space in a pulp mill plant which is under vacuum in relation to its surroundings, which valve system comprises:

a valve unit arranged in association with a wall which delimits said pulp accommodating and conveying space and has a wall opening through said wall, which valve unit comprises, a valve which is normally shut and closes said wall opening but opens and allows air from the surroundings into said pulp accommodating and conveying space if the vacuum should exceed a previously defined value, wherein said valve comprises, a valve housing which is connected to said wall in association with the wall opening and which has at least one inlet opening for air, a passage for the air between said at least one inlet opening and said pulp accommodating and conveying space, and a valve seat and a valve body with a sealing surface which is normally pressed against the valve seat by an external force with counteraction by the vacuum in order to keep the passage closed when the vacuum does not exceed the defined value, but permits the passage to be opened by the force exerted on the valve body when the vacuum exceeds said defined value; and a pneumatic cylinder, having located inside said cylinder a piston and a piston rod connected to the valve body, such that the piston, the piston rod, and the valve body form an integrated unit, and wherein a pneumatic power source constituting a separate unit, which is arranged at a distance from the valve unit and connected to the pneumatic cylinder via a conduit, is arranged to develop a pressure in a cylinder chamber in the cylinder and thereby a force on the piston, which force is transferred to the valve body via the piston rod, wherein said external force is obtained from the pneumatic power source.

2. Valve system according to claim 1, wherein said pneumatic power source consists of an air accumulator which contains air at a given excess pressure in relation to the surrounding pressure.

3. Valve system according to claim 2, wherein said accumulator has an inner volume that is expandable by a manual operation, wherein when said accumulator expands the volume of the air in said accumulator increases.

4. Valve system according to claim 2, wherein said air accumulator is connected to a compressed air network.

5. Valve system according to claim 4, further comprising a reducing valve arranged between the compressed air network and the accumulator.

6. Valve system according to claim 1, further comprising manually operated means for regulation of the volume of an air accumulator.

* * * * *